US012661988B1

(12) United States Patent
Nasir et al.

(10) Patent No.: US 12,661,988 B1
(45) Date of Patent: Jun. 23, 2026

(54) STOWABLE INPUT INTERFACE FOR USE WITH IN-VEHICLE DISPLAYS

(71) Applicant: Ford Global Technologies, LLC, Dearborn, MI (US)

(72) Inventors: Mansoor Nasir, Canton, MI (US); Rami Al Khatib, Dearborn, MI (US); Mahmoud Yousef Ghannam, Canton, MI (US)

( * ) Notice: Subject to any disclaimer, the term of this patent is extended or adjusted under 35 U.S.C. 154(b) by 0 days.

(21) Appl. No.: 19/177,405

(22) Filed: Apr. 11, 2025

(51) Int. Cl.
| | |
|---|---|
| *B60K 35/60* | (2024.01) |
| *B60K 35/10* | (2024.01) |
| *B60K 35/22* | (2024.01) |
| *G06F 3/02* | (2006.01) |
| *G06F 3/0354* | (2013.01) |

(52) U.S. Cl.
CPC .............. *B60K 35/60* (2024.01); *B60K 35/10* (2024.01); *B60K 35/22* (2024.01); *G06F 3/0202* (2013.01); *G06F 3/03547* (2013.01); *B60K 2360/1434* (2024.01)

(58) Field of Classification Search
None
See application file for complete search history.

(56) References Cited

U.S. PATENT DOCUMENTS

| | | | |
|---|---|---|---|
| 7,338,224 B2 | 3/2008 | Jones et al. | |
| 8,807,621 B2 * | 8/2014 | Stephan | B60R 7/06 |
| | | | 296/37.12 |
| 11,194,471 B1 * | 12/2021 | Jacome | G06F 3/04842 |
| 11,840,144 B2 * | 12/2023 | Szczerba | B60K 35/53 |
| 2006/0075934 A1 | 4/2006 | Ram | |

| | | | |
|---|---|---|---|
| 2006/0155431 A1 * | 7/2006 | Berg | B60K 35/53 |
| | | | 701/2 |
| 2006/0286944 A1 * | 12/2006 | Songwe, Jr. | B62D 1/105 |
| | | | 455/99 |
| 2007/0262854 A1 * | 11/2007 | Colburn | B60K 35/28 |
| | | | 296/70 |
| 2013/0187875 A1 * | 7/2013 | Matsuoka | G06F 3/041 |
| | | | 345/173 |
| 2014/0095000 A1 * | 4/2014 | Waller | G07C 5/008 |
| | | | 701/1 |
| 2016/0170499 A1 * | 6/2016 | Jiang | G06F 3/002 |
| | | | 345/174 |
| 2016/0257264 A1 * | 9/2016 | Rawlinson | B60N 3/001 |

(Continued)

FOREIGN PATENT DOCUMENTS

| | | | |
|---|---|---|---|
| CN | 2353955 Y | * | 12/1999 |
| EP | 2917105 B1 | | 6/2019 |

OTHER PUBLICATIONS

Bogdan Popa, Ford Cars To Get Google Chrome and Bluetooth Keyboards for Browsing and Gaming, https://www.autoevolution.com/news/ford-cars-to-get-google-chrome-and-bluetooth-keyboards-for-browsing-and-gaming-228102.html#:~:text=Ford%20is%20the%20next%20big%20name%20to%20adopt,in%20select%20models%20wearing%20Ford%20and%20Lincoln%20badges., Jan. 24, 2024, pp. 1.

(Continued)

*Primary Examiner* — Kenneth Bukowski
(74) *Attorney, Agent, or Firm* — Frabk Lollo; Eversheds Sutherland (US) LLP

(57) ABSTRACT

A vehicle comprising a center console and an input unit is disclosed. The center console may include an in-vehicle infotainment (IVI) system. The input unit may be communicatively coupled with the IVI system. The input unit may be stowed or folded in the center console when not in use and moved out of the center console when in use.

20 Claims, 5 Drawing Sheets

(56) References Cited

U.S. PATENT DOCUMENTS

| | | | | |
|---|---|---|---|---|
| 2016/0280375 A1* | 9/2016 | Heredia | .............. | G06F 3/04886 |
| 2016/0375924 A1* | 12/2016 | Bodtker | ................ | B60K 35/60 |
| | | | | 74/552 |
| 2017/0253191 A1* | 9/2017 | Nash | ...................... | B60K 35/22 |
| 2017/0253192 A1* | 9/2017 | Faist | ..................... | B60R 16/027 |
| 2018/0052541 A1* | 2/2018 | Hoggarth | .............. | B60K 35/10 |
| 2023/0031862 A1* | 2/2023 | Szczerba | ................ | B60K 35/10 |
| 2023/0382285 A1* | 11/2023 | Salter | ................. | B60R 11/0252 |
| 2023/0398871 A1 | 12/2023 | Salter et al. | | |

OTHER PUBLICATIONS

Bonnie Cha, Think Outside Stowaway Universal Bluetooth Keyboard Review: Think Outside Stowaway Universal Bluetooth Keyboard, https://www.cnet.com/reviews/think-outside-stowaway-universal-bluetooth-keyboard-review/, Oct. 5, 2004, pp. 1-2.

Prehkeytec Gmbh, Backlit Vehicle Keyboard With Touchpad | MW 820, https://www.prehkeytec.com/products/programmable-keyboards/mw-820/, 2025, pp. 1.

* cited by examiner

STOWABLE INPUT INTERFACE FOR USE WITH IN-VEHICLE DISPLAYS

FIELD

The present disclosure relates to vehicles and more specifically to stowable input interface for use with in-vehicle displays.

BACKGROUND

With the advent of connected car features and autonomous driving, modern vehicles are increasing becoming mobile offices. Many users use their laptops, mobile phones, in-vehicle displays, etc. to perform office work while sitting inside the vehicle. For example, many users respond to emails, attend virtual meetings, and/or the like, while sitting inside the vehicle.

Although advanced vehicle technologies such as vehicle display and smartphone integration, screen sharing, etc. have provided convenience to the users to perform office work from their vehicles, they are still far from providing a truly functional and comfortable alternative to a traditional desk setup.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
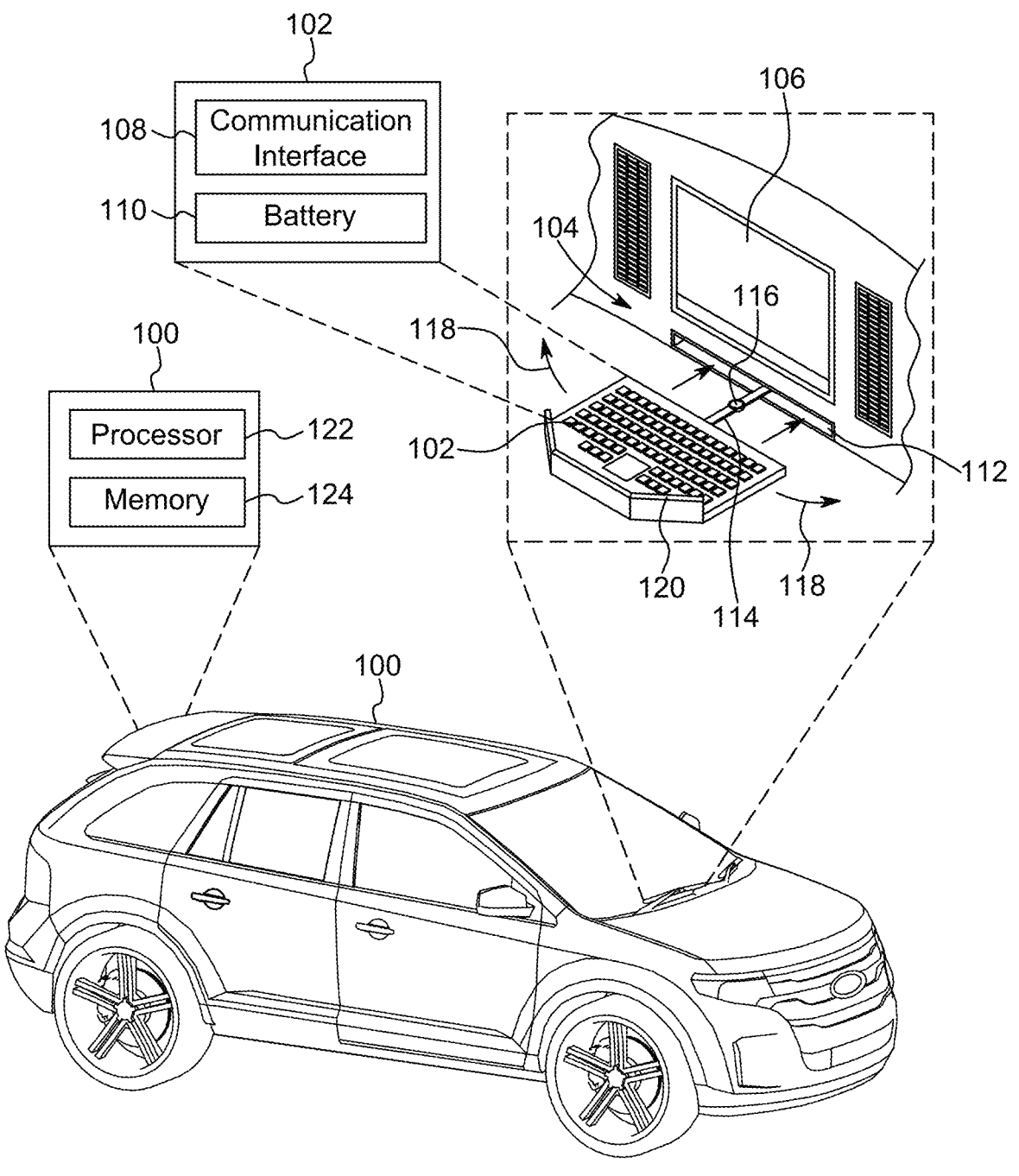
FIG. 1 depicts an example vehicle in accordance with the present disclosure.

The present disclosure describes a vehicle that may be conveniently used by a user as mobile office. The vehicle may include a foldable and/or stowable input interface or input unit that may be integrated or incorporated into a center console of the vehicle. The input unit may be, for example, a keyboard, a trackpad, and/or the like. The center console may be that space/area of the vehicle that may be between a driver sitting area and a front passenger sitting area, and may extend from between the sitting areas up into the dashboard area. The center console may include a plurality of components including, but not limited to, an in-vehicle infotainment (IVI) system, one or more storage compartments, cup holders, armrests, a gear shifter (in some cases), power outlets/USB ports, and/or the like.

The keyboard may be communicatively coupled with the IVI system, thereby enabling the vehicle user (e.g., the driver or the passenger) to interact with the IVI system via the keyboard. For example, the user may edit a document or a spreadsheet, access and browse the Internet, or type any text on the IVI system's display screen via the keyboard. In this manner, the keyboard enables the user to experience a traditional desk setup of an office, while sitting inside the vehicle.

In some aspects, the keyboard may be communicatively coupled with the IVI system via a wired connection. In other aspects, the keyboard may be wirelessly coupled with the IVI system, e.g., via Bluetooth.

Furthermore, the keyboard may be stowed or folded in the center console when not in use and moved out of the center console when in use. In an exemplary aspect, the center console may include an elongated slot that may be present below the IVI system or any other location in the center console (e.g., at a console's side edge). The keyboard may be stowed in the elongated slot when the keyboard is not in use and moved out of the elongated slot when the keyboard is desired to be used.

In some aspects, the keyboard may automatically couple with the IVI system (e.g., via Bluetooth) when the keyboard moves out of the center console, to enable the user to conveniently interact with the IVI system via the keyboard. Further, in some aspects, the keyboard may automatically decouple from the IVI system when the keyboard is stowed inside the center console, to conserve power consumption by the keyboard.

The vehicle/center console may further include an arm or a support stand that may be connected between the center console and the keyboard. The support stand may be retractable, and the keyboard may move inside and outside the central console's elongated slot via the support stand. For example, the support stand may retract into the elongated slot (thereby causing the keyboard to move into the elongated slot) when the keyboard may not be in use. In a similar manner, the support stand may extend out of the elongated slot (thereby causing the keyboard to move out of the elongated slot) when the keyboard is desired to be used by the user.

To further enhance user's convenience of operating the keyboard, the vehicle or the keyboard may include a hand rest that may provide support to the user's palms and wrists when the user uses the keyboard. In further aspects, to ensure optimal keyboard operation, the vehicle (e.g., via a vehicle processor) enables the driver to extend the keyboard out of the central console when the vehicle is in an autonomous driving mode (e.g., L3 or L4, where such is lawful and safe) or stationary. Stated another way, the vehicle may not enable the driver to extend the keyboard out of the central console when the driver may be driving the vehicle. In some aspects, the vehicle may lock the keyboard or disable it when the vehicle is in motion (or in certain driving conditions). In such cases, the vehicle may unlock the keyboard only when the user's confirmation or override is obtained and certain predefined preventive measures are applied by the vehicle and/or the user before enabling access to the keyboard.

In further aspects, to prevent unauthorized access of the keyboard, the vehicle may use inputs obtained from one or more vehicle's sensors (e.g., cameras, image sensors, etc.) to check/determine if an un-authorized user is attempting to access/use the keyboard. This may include the driver while the vehicle is in motion and/or in situations where it would otherwise be unlawful or unsafe for the driver to be utilizing the keyboard. In one embodiment, cameras in the vehicle may detect when the driver is utilizing the keyboard, and not a passenger. Responsive to such determination, the vehicle may alert the vehicle owner and/or disable access to the keyboard.

In some aspects, the keyboard may draw power for its operation from the vehicle's power supply, when the keyboard may be extended out of the central console. In additional aspects, the keyboard may have an in-built battery that may provide power to the keyboard for its operation, e.g., when the vehicle may be switched OFF. Furthermore, the keyboard may enter a low-power consumption mode when the keyboard is stowed inside the central console.

The present disclosure discloses a keyboard and central console system that provides various advantages over conventional mobile office setup. For example, the adjustable support stand and the customizable configurations of the keyboard ensure that the user can maintain proper posture and reduce strain during extended use of the keyboard. Further, the keyboard is easy to deploy, and can be neatly stowed without interfering with the driving operations. The mechanism disclosed in the present disclosure ensures smooth keyboard deployment and retraction, keeping the keyboard accessible yet unobtrusive. Furthermore, the keyboard is compact and can be easily folded and/or stowed when not in use. The keyboard is also easily detachable and available for use in lap or another vehicle surface. In addition, the keyboard integrates with the vehicle's power supply to ensure efficient energy use, and prevents battery drain while maintaining reliable operation of the keyboard.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example vehicle 100 in accordance with the present disclosure. FIG. 1 will be described in conjunction with FIG. 2.

The vehicle 100 may take the form of any passenger or commercial vehicle, for example, a car, a work vehicle, a crossover vehicle, a truck, a van, a minivan, a taxi, a bus, etc. The vehicle 100 may be a manually driven vehicle and/or may be configured to operate in a partially or fully autonomous mode. Further, the vehicle 100 may include any powertrain such as a gasoline engine, one or more electrically-actuated motor(s), a hybrid system, etc.

It is known that with the advent of connected car features and autonomous driving, vehicles are increasing becoming mobile offices. For example, many users use laptops, mobile phones, in-vehicle displays, etc. to respond to emails, attend virtual meetings and/or work on complex projects while sitting inside their vehicles.

While advanced vehicle features such as display screen and smartphone integration, display screen sharing, etc. offer some functionality and convenience to the users, they fall short of providing a truly productive workspace. Small screen sizes, limited multitasking capabilities, and lack of ergonomic input methods (like a proper keyboard and trackpad) make complex tasks like document editing or spreadsheet manipulation cumbersome and inefficient, when the users work from their vehicles. Many users use voice commands to perform office tasks such as document editing or content preparation, however, the reliance on voice commands for many functions can also be unreliable, particularly in noisy environments. While the current in-vehicle infotainment systems offer glimpses of mobile office potential, they are far from providing a truly functional and comfortable alternative to a traditional desk setup.

Furthermore, relying solely on on-screen digital keyboards for tasks requiring significant text input (like document editing, spreadsheet manipulation, etc.) is inefficient and can result in errors in the work product. In addition, carrying Bluetooth keyboards and trackpads, while offering enhanced typing accuracy and speed, adds bulk and inconvenience, negating some of the portability benefits of a mobile office.

The present disclosure addresses the challenges described above by incorporating or integrating a foldable and/or stowable input interface or input unit 102 in a center console 104 of the vehicle 100. In some aspects, the center console 104 may be that space/area of the vehicle 100 that may be between a driver sitting area and a front passenger sitting area. The center console 104 may include a plurality of components including, but not limited to, an in-vehicle infotainment (IVI) system 106, one or more storage compartments, cup holders, armrests, a gear shifter (in some cases), power outlets/USB ports, and/or the like. For the sake of simplicity, only the IVI system 106 is shown in FIG. 1 as part of the center console 104, however, such depiction should not be construed as limiting.

The input unit 102 may be a keyboard, a touchpad or any other similar input interface. Hereinafter, the input unit 102 is referred to as keyboard 102. In some aspects, the keyboard 102 may be communicatively coupled with the IVI system 106, thereby enabling a vehicle user (e.g., a driver or a passenger) to interact with the IVI system 106 via the keyboard 102. For example, the user may edit a document or a spreadsheet, access and browse the Internet, or type any text on the IVI system's display screen via the keyboard 102. In this manner, the keyboard 102 enables the user to experience a traditional desk setup of an office, while sitting inside the vehicle 100. By using the keyboard 102, the user is not required to use the IVI system's digital keyboard (or a keypad of a user device, e.g., a mobile phone, which may be coupled with the IVI system 106), thereby considerably enhancing user convenience of performing office work from the vehicle 100. This also saves the real estate on the IVI system's display screen, which would otherwise be partially used to render the digital keyboard.

In some aspects, the IVI system 106 may additionally be communicatively coupled with a user device, e.g., a laptop (not shown, or any user or computing device, such as a phone, wearable, tablet, etc.), and the IVI system display screen may render or "mirror" the laptop screen. In this manner, the user may conveniently work on the user's laptop while sitting in the vehicle 100 by sharing the laptop screen on the IVI system display screen and using the keyboard 102 to access/edit/manipulate files, documents, spreadsheets, entries, etc. stored on the laptop via the mirrored laptop screen. In one embodiment, the keyboard and/or a mouse/trackpad may connect to the laptop directly via, for example, Bluetooth, for sending user input to the laptop, and/or the IVI system may connect with the laptop and send user input signals associated with the keyboard and/or mouse/trackpad to the laptop, and the IVI system display may operate as a second monitor or mirror of the laptop.

In other aspects, the vehicle 100/IVI system 106 may render files, documents, etc. that the user may download on the IVI system 106 from the cloud (e.g., via the Internet) or retrieve from a vehicle memory. In this case, the user may not be required to couple the IVI system 106 with the user's laptop or any other device, and may instead download/retrieve the files to be worked upon from the cloud or the vehicle memory. In this case as well, the user may use the keyboard 102 to edit the downloaded/retrieved files.

In some aspects, the keyboard 102 may be communicatively coupled with the IVI system 106 via a wired connection. In other aspects, the keyboard 102 may be wirelessly coupled with the IVI system 106. In this case, as an example, the keyboard 102 may be wirelessly coupled with the IVI system 106 via Bluetooth or any other similar wireless telecommunication protocol. In some aspects, the keyboard 102 may include a plurality of components including, but not limited to, a communication interface 108, an in-built battery 110, and/or the like. The communication interface 108 may include a Bluetooth transceiver (or any other similar transceiver) that may enable the keyboard 102 to communicatively couple with the IVI system 106 (or any other communication device inside or outside the vehicle 100) via Bluetooth or any other similar wireless telecommunication protocol.

In one exemplary aspect, the keyboard 102 may be stowed or folded in the center console 104 when not in use and moved out of the center console 104 when in use. For example, the user may cause the keyboard 102 to move out of the center console 104 when the user desires to use the vehicle 100 as mobile office, and may cause the keyboard 102 to move back into the center console 104 when the user is done with the work. In some aspects, the keyboard 102 may automatically couple with the IVI system 106 (e.g., via the communication interface 108 and Bluetooth) when the keyboard 102 moves out of the center console 104, to enable the user to conveniently interact with the IVI system 106 via the keyboard 102. Further, in some aspects, the keyboard 102 may automatically decouple from the IVI system 106 when the keyboard 102 is stowed inside the center console 104, to conserve power consumption by the keyboard 102. Furthermore, in this case, the keyboard 102 may enter a low power consumption mode (e.g., by switching off the communication interface 108) when the keyboard 102 is stowed in the center console 104.

In the exemplary aspect depicted in FIG. 1, the center console 104 is shown to include an elongated slot 112 that may be present below the IVI system 106 (or any other location in the center console 104). The keyboard 102 may stowed in the elongated slot 112 when the keyboard 102 is not in use and moved out of the elongated slot 112 when the keyboard 102 is desired to be used.

The vehicle 100/center console 104 may further include an arm or a support stand 114 that may be connected between the center console 104 and the keyboard 102. Stated another way, the keyboard 102 may be connected to the center console 104 via the support stand 114. The support stand 114 may be retractable, and the keyboard 102 may move inside and outside the elongated slot 112 via the support stand 114. For example, the support stand 114 may retract into the elongated slot 112 (thereby causing the keyboard 102 to move into the elongated slot 112) when the keyboard 102 may not be in use. In a similar manner, the support stand 114 may extend out of the elongated slot 112 (thereby causing the keyboard 102 to move out of the elongated slot 112) when the keyboard 102 is desired to be used by the user.

The support stand 114 may be adjustable and rotatable, and configured to move in 3-dimensions (e.g., up/down, left/right, forward/backward) within the vehicle's interior portion, thereby enabling the user to easily adjust the keyboard's position as per the user's requirement and comfort. The adjustable nature of the support stand 114 further allows the driver as well as the passenger (e.g., the front passenger) to use the keyboard 102 as per their requirements. For example, the driver may adjust and move the support stand 114 (and hence the keyboard 102) towards the driver's side when the driver desires to use the keyboard 102. Similarly, the passenger may adjust and move the support stand 114 (and hence the keyboard 102) towards the passenger's side when the passenger desires to use the keyboard 102.

In an exemplary aspect, the support stand 114 may include a pivot joint 116 (or a hinge point/connector) that may enable rotatory motion of the support stand 114, as shown by arrows 118. The user (e.g., the driver/passenger) may rotate the support stand 114 towards the user's side via the pivot joint 116 to adjust and fix a comfortable position of the keyboard 102 for office work in the vehicle 100. The support stand 114 may also include a locking mechanism (which may be, for example, part of the pivot joint 116) that may enable the user to fix/lock the keyboard's position after the user has moved the keyboard 102 as per the user's requirement.

In further aspects, the keyboard 102 may be detachable from the support stand 114. For example, if a rear passenger desires to use the keyboard 102, the passenger may detach the keyboard 102 from the support stand 114, and access the IVI system 106 via the keyboard 102 while sitting at the rear passenger sitting area. Since the keyboard 102 is communicatively coupled with the IVI system 106 via Bluetooth, the keyboard 102 may enable the rear passenger to interface with the IVI system 106, even when the keyboard 102 is detached from the support stand 114. In additional aspects, due to its Bluetooth connection, the keyboard 102 may continue to interact with the IVI system 106 even if a user moves the keyboard 102 outside the vehicle 100 (as long as the keyboard 102 is within the Bluetooth/predefined range of the vehicle 100).

To further enhance user's convenience of operating the keyboard 102, the vehicle 100 or the keyboard 102 may include a hand rest 120 that may provide support to the user's palms and wrists when the user uses the keyboard 102. In some aspects, the hand rest 120 may be part of the keyboard 102, as shown in FIG. 1. In other aspects (not shown), the hand rest 120 may be a support structure external to the keyboard 102, which may connected/attached to the keyboard 102 to provide support to the user's palms/wrists.

During operation, the user may transmit a user input/request to the vehicle 100 to move the keyboard 102 out of the elongated slot 112 when the user desires to use the vehicle 100 as mobile office. In some aspects, the user may transmit the request by actuating or pressing a dedicated actuator/button on the center console 104. In other aspects, the user may transmit the request via the IVI system 106 or a user device (e.g., a mobile phone, a laptop, etc.).

A vehicle processor (e.g., a processor 122) may obtain the request when the user transmits the request to move the keyboard 102 out of the elongated slot 112. Responsive to obtaining the request, in some aspects, the processor 122 may first determine/check the vehicle's operating state. Specifically, the processor 122 may check whether the vehicle 100 is in an autonomous driving mode (e.g., L3 or L4 mode) or stationary. Responsive to determining that the vehicle 100 is not in an autonomous driving mode or stationary, the processor 122 may not move the keyboard 102 out of the elongated slot 112 and may instead output an error notification on the IVI system 106 and/or the user device. The user may move the vehicle 100 to the autonomous driving mode or park the vehicle 100 responsive to viewing/hearing the error notification. In some aspects, the processor 122 may lock the keyboard 102 or disable it when the vehicle 100 is in motion (or in certain driving conditions). In such cases, the processor 122 may unlock the keyboard 102 only when the user's confirmation or override is obtained and certain predefined preventive measures are applied by the vehicle 100 and/or the user before enabling access to the keyboard 102.

On the other hand, responsive to determining that the vehicle 100 is in the autonomous driving mode or stationary, the processor 122 may move the support stand 114 (and hence the keyboard 102) out of the elongated slot 112, so that the user may operate the keyboard 102. In some aspects, the keyboard 102 may automatically "power-up" and wirelessly connect with the IVI system 106 when the keyboard 102 moves out of the elongated slot 112. In some aspects, the keyboard 102 may draw power from the vehicle's power supply via the support stand 114 when the keyboard 102 moves out of the elongated slot 112 and is operated by the user. In this case, the support stand 114 may include wires that may transfer power from the vehicle's power supply to the keyboard 102. In other aspects, the keyboard 102 may wirelessly draw power from the vehicle's power supply. In yet another aspect, the keyboard 102 may draw power from its in-built battery 110. In this case, the battery 110 may get charged via the vehicle's power supply whenever the vehicle 100 is switched ON. Thereafter, when the vehicle 100 is switched OFF or when the user detaches the keyboard 102 from the support stand 114, the battery 110 may supply power to the keyboard 102 so that the user may seamlessly operate the keyboard 102 (irrespective of whether the keyboard 102 is attached to or detached from the support stand 114).

Figure 2:
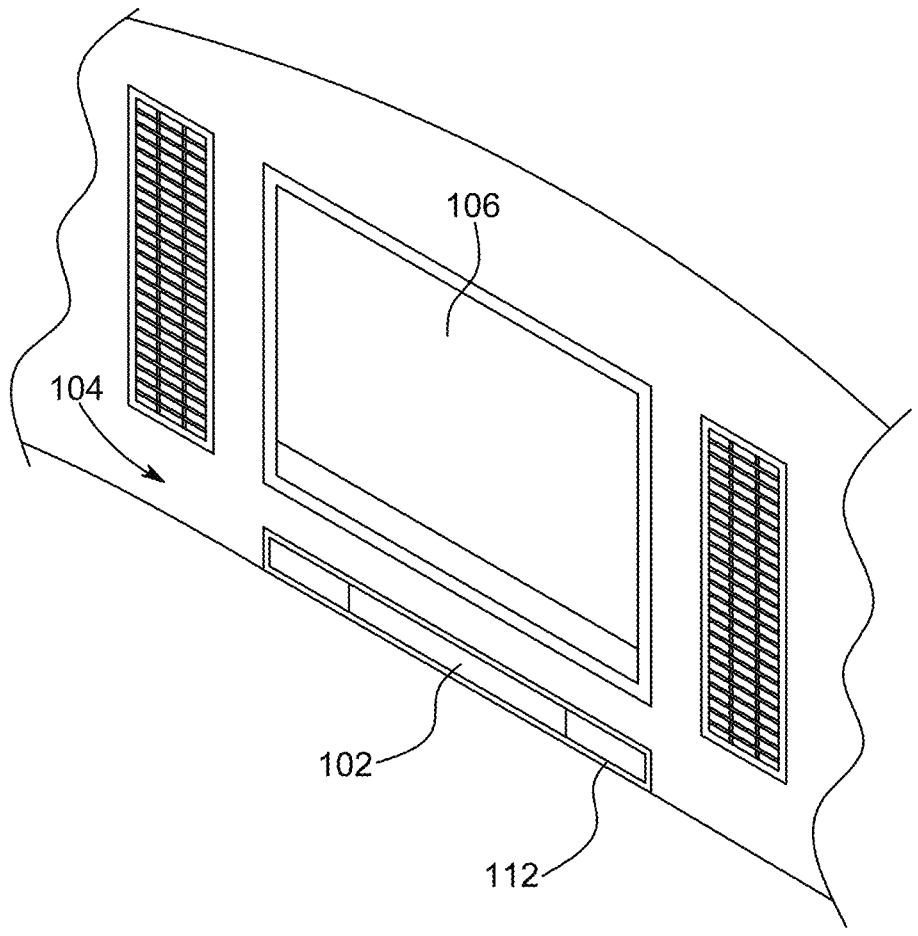
FIG. 2 depicts a view of an example first center console of a vehicle in accordance with the present disclosure.

Furthermore, the user may transmit another request to the processor 122 or simply push the keyboard 102 into the elongated slot 112 to stow the keyboard 102 in the center console 104 when the user is done operating the keyboard 102. In some aspects, the keyboard 102 may get completely inserted into the center console 104 (without leaving any obstructing parts outside), resulting in a flush finish (as shown in FIG. 2), when the keyboard 102 is stowed in the center console 104. In this manner, the keyboard 102 does not obstruct vehicle's driving experience or any other function when the keyboard 102 is stowed, thereby considerably enhancing the user's case of operating the vehicle 100.

In some aspects, in addition to the processor 122, the vehicle 100 may include a memory 124. The processor 122 may be disposed in communication with the memory 124. The processor 122 may utilize the memory 124 to store programs in code and/or to store data for performing aspects in accordance with the disclosure. The memory 124 may be a non-transitory computer-readable storage medium or memory storing program codes that may enable the processor 122 to perform operations as per the present disclosure. The memory 124 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

Although the description above describes an aspect where the keyboard 102 communicatively couples with the IVI system 106, the present disclosure is not limited to such an aspect. In other aspects, the keyboard 102 may also wirelessly couple with one or more additional communication devices inside or outside the vehicle 100. For example, the user may wirelessly couple the keyboard 102 with the user's laptop via Bluetooth, which may enable the user to operate the laptop via the keyboard 102. In this manner, the keyboard 102 may also be used by the user to operate other equipment, and not just the IVI system 106.

In further aspects, to prevent unauthorized access of the keyboard 102, the processor 122 may use inputs obtained from one or more vehicle's sensors (e.g., cameras, image sensors, etc.) to check/determine if an un-authorized user is attempting to access/use the keyboard 102. In some aspects, the un-authorized user may be the vehicle's driver when the vehicle 100 is in motion and/or in situations where it would otherwise be unlawful or unsafe for the driver to be utilizing the keyboard 102. Responsive to such determination, the processor 122 may alert the vehicle owner (e.g., by outputting an audible alert) and/or disable access to the keyboard 102.

The keyboard and console system, as described in the present disclosure, provides various advantages over conventional mobile office setup. For example, the adjustable support stand 114 and the customizable configurations of the keyboard 102 ensure that the user can maintain proper posture and reduce strain during extended use of the keyboard 102. The support stand 114 is adjustable to different angles, ensuring ergonomic comfort and reducing strain on the user's wrists and arms during use. The support stand 114 also allows easy use by either the driver or the front passenger. Further, the keyboard 102 is easy to deploy, and can be neatly stowed without interfering with the driving operations. The mechanism disclosed in the present disclosure ensures smooth keyboard deployment and retraction, keeping the keyboard 102 accessible yet unobtrusive.

Furthermore, the keyboard 102 is compact and can be easily folded and/or stowed when not in use. The keyboard 102 is also easily detachable (e.g., the keyboard 102 can be easily released by pushing a dedicated button) and available for use in lap or another vehicle surface. In addition, the hand rest 120 offers support (e.g., cushioned support) for the user's palms and wrists, mimicking the ergonomic benefits of a traditional desk setup and enhancing user comfort during extended typing sessions.

Further, the communication interface 108 enables seamless wireless connection to the IVI system 106 and other devices, allowing users to switch easily between different input sources/devices. Furthermore, the keyboard 102 integrates with the vehicle's power supply to ensure efficient energy use, and prevents battery drain while maintaining reliable operation of the keyboard 102 and connected devices. Furthermore, the keyboard 102 utilizes high-quality materials that match the vehicle's interior, providing a premium look and feel while ensuring the keyboard's longevity and resilience.

The vehicle 100 implements and/or performs operations, as described here in the present disclosure, in accordance with the owner manual and safety guidelines. In addition, any action taken by the vehicle user should comply with all the rules specific to the location and operation of the vehicle 100 (e.g., Federal, state, country, city, etc.). The notifications, as provided by the vehicle 100, should be treated as suggestions and only followed according to any rules specific to the location and operation of the vehicle 100.

Figure 3:
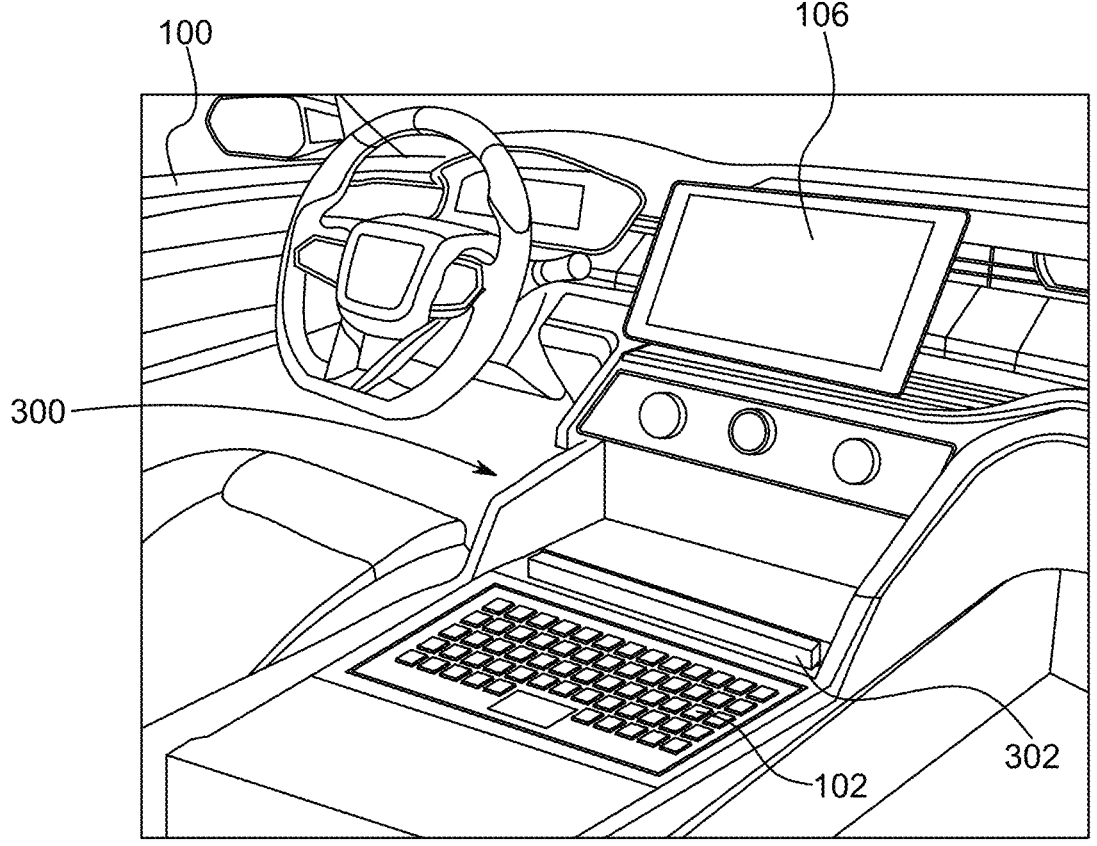
FIG. 3 depicts a view of an example second center console of a vehicle in accordance with the present disclosure.

FIG. 3 depicts a view of an example second center console 300 of the vehicle 100 in accordance with the present disclosure. The center console 300 may be similar to the center console 104 described above; however, in the exemplary aspect depicted in FIG. 3, the keyboard 102 is integrated with the center console 300. In this case, the vehicle 100/center console 300 may further include a sliding cover 302 that may cover the keyboard 102 when the keyboard 102 may not be in use. When the user desires to use the keyboard 102, the user may slide the sliding cover 302 away from the keyboard 102, thereby exposing the keyboard 102 and enabling the user to use it.

The remaining details of the center console 300 and the keyboard 102 depicted in FIG. 3 are the same as the details provided above in conjunction with FIG. 1, and hence are not described here again for the sake of simplicity and conciseness.

Figure 4A:
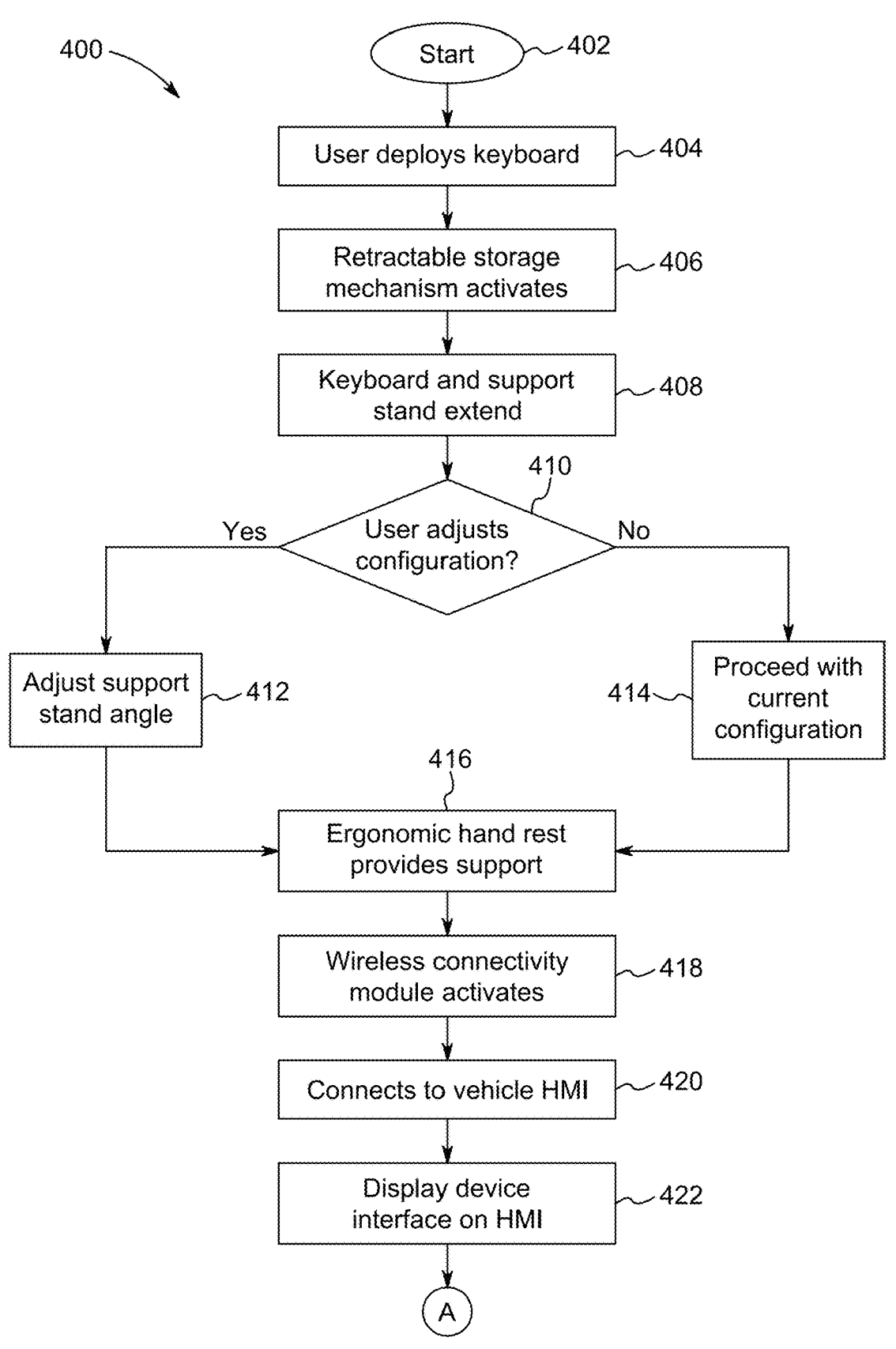
FIGS. 4A and 4B depict a flow diagram of an example method for operating an input interface of a vehicle in accordance with the present disclosure.
Figure 4B:
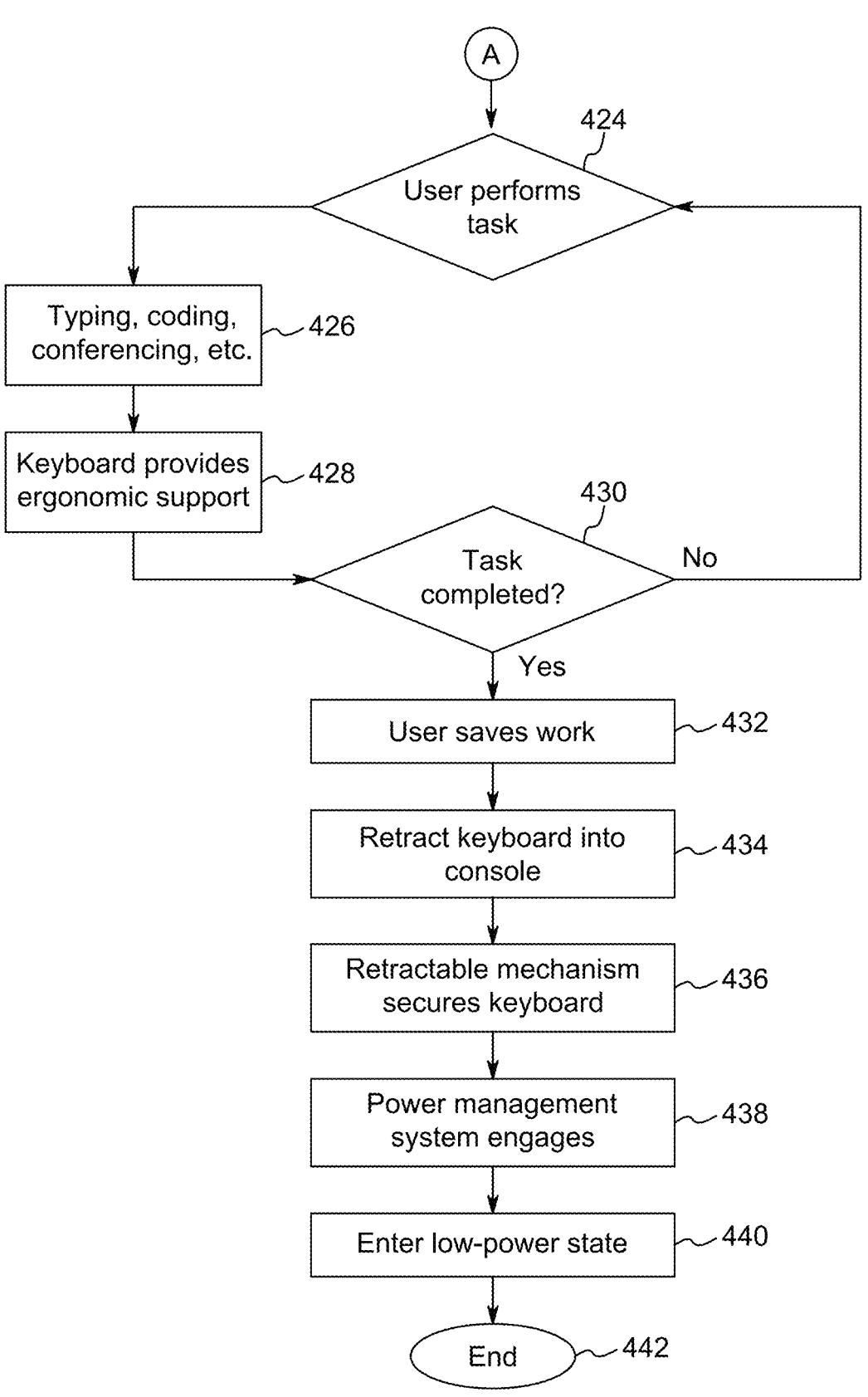

FIGS. 4A and 4B depict a flow diagram of an example method 400 for operating an input interface (e.g., the keyboard 102) in accordance with the present disclosure. FIGS. 4A and 4B may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include the user deploying the keyboard 102 (e.g., by transmitting the request to the vehicle 100 to move the keyboard 102 out of the center console 104, as described above). At step 406, the method 400 may include activating the keyboard's retractable storage mechanism or the support stand 114 responsive to the user deploying the keyboard 102. A step 408, the method 400 may include extending the support stand 114 and the keyboard 102 out from the center console 104.

At step 410, the method 400 may include determining whether the user has adjusted the keyboard 102 position, angle or configuration. If the user has adjusted the keyboard's configuration, then at step 412, the method 400 may include adjusting the support stand angle. On the other hand, if the user has not adjusted the keyboard's configuration, then the method 400 proceeds with the current configuration/orientation, as shown in step 414.

At step 416, the method 400 may include the ergonomic hand rest 120 providing support to the user's wrists/palms. At step 418, the method 400 may include activating the keyboard's wireless connectivity module or the communication interface 108. At step 420, the method 400 may include connecting the keyboard 102 to the IVI system 106 (or the vehicle HMI) via the communication interface 108.

At step 422, the method 400 may include interfacing the keyboard 102 (and the user's laptop, if required) with the vehicle HMI/IVI system 106. At step 424, the method 400 may include determining whether the user is performing any task via the keyboard 102. The task may be typing, coding, conferencing, etc., as shown by a block 426. If the user is performing the task, then at step 428, the method 400 may include providing ergonomic support to the user via the keyboard 102 (e.g., via the hand rest 120). At step 430, the method may include determining whether the user has completed the task. If not, the steps 424, 426, 428 and 430 may be iteratively performed till the user completes the task.

When the user completes the task, then at step 432, the method 400 may include the user saving the work. At step 434, the method 400 may include retracting the keyboard 102 into the center console 104. At step 436, the method 400 may include securing the keyboard 102 via the retractable mechanism or the support stand 114. At step 438, the method

400 may include engaging the vehicle's power management system to cause the keyboard 102 to enter the low-power state (as shown in step 440).

The method 400 may end at step 442.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a center console comprising an in-vehicle infotainment (IVI) system; and
an input unit configured to communicatively couple with the IVI system, wherein the input unit is stowed or folded in the center console when not in use and moved out of the center console when in use, wherein the input unit automatically communicatively couples with the IVI system when the input unit is moved out of the center console, and wherein the input unit automatically communicatively decouples from the IVI system when the input unit is stowed or folded in the center console.

2. The vehicle of claim 1, wherein the center console further comprises an elongated slot, and wherein the input unit is stowed in the elongated slot when not in use and moved out of the elongated slot when in use.

3. The vehicle of claim 1, wherein the input unit is at least one of a keyboard or a trackpad.

4. The vehicle of claim 1, wherein the input unit automatically wirelessly couples with the IVI system when the input unit is moved out of the center console, and wherein the input unit automatically wirelessly decouples from the IVI system when the input unit is stowed or folded in the center console.

5. The vehicle of claim 1, wherein the input unit comprises a communication interface, and wherein the communication interface is switched off when the input unit is moved out of the center console.

6. The vehicle of claim 1, wherein the input unit is further configured to wirelessly couple with one or more additional communication devices inside or outside the vehicle.

7. The vehicle of claim 1, further comprising a support stand connected between the center console and the input unit.

8. The vehicle of claim 7, wherein the support stand is retractable, and wherein the input unit moves inside and outside of the center console via the support stand.

9. The vehicle of claim 7, wherein the support stand is adjustable and rotatable, and configured to move in 3-dimensions within a vehicle interior portion.

10. The vehicle of claim 9, wherein the support stand comprises a pivot joint configured to enable rotatory motion of the support stand.

11. The vehicle of claim 7, wherein the input unit is detachable from the support stand.

12. The vehicle of claim 1, further comprising a hand rest configured to provide support to a user's palms and wrists when the user uses the input unit.

13. The vehicle of claim 1, wherein the IVI system is configured to mirror a display screen of a user device, and wherein the input unit is configured to enable a user to access one or more files stored on the user device via the mirrored display screen.

14. The vehicle of claim 1, wherein the input unit is configured to draw power from a vehicle power supply during an input unit operation.

15. The vehicle of claim 1, wherein the input unit comprises an in-built battery configured to supply power to the input unit during an input unit operation.

16. The vehicle of claim 1, wherein the input unit enters a low power consumption mode when the input unit is stowed in the center console.

17. The vehicle of claim 1, further comprising a sliding cover configured to cover the input unit.

18. The vehicle of claim 1, further comprising a processor configured to:
obtain a user input from a user to move the input unit out of the center console;
determine that the vehicle is in an autonomous driving mode or stationary responsive to obtaining the user input; and
automatically move the input unit out of the center console responsive to determining that the vehicle is in the autonomous driving mode or stationary.

19. A vehicle comprising:
a center console comprising an in-vehicle infotainment (IVI) system, wherein the center console further comprises an elongated slot; and
a keyboard configured to communicatively couple with the IVI system, wherein:
the keyboard is stowed in the elongated slot when not in use and moved out of the elongated slot when in use,
the keyboard automatically communicatively couples with the IVI system when the keyboard is moved out of the elongated slot,
the keyboard automatically communicatively decouples from the IVI system when the keyboard is stowed in the elongated slot,
the keyboard draws power from a vehicle power supply during a keyboard operation, and
the keyboard enters a low power consumption mode when the keyboard is stowed in the elongated slot.

20. A vehicle comprising:
a center console comprising an in-vehicle infotainment (IVI) system;
an input unit configured to communicatively couple with the IVI system, wherein:
the input unit is integrated with the center console,
the input unit is stowed in the center console when not in use and moved out of the center console when in use,
the input unit automatically communicatively couples with the IVI system when the input unit is moved out of the center console, and the input unit automatically communicatively decouples from the IVI system when the input unit is stowed in the center console; and a sliding cover configured to cover the input unit when the input unit is not in use.

* * * * *